US012591110B2

(12) United States Patent     (10) Patent No.: US 12,591,110 B2

Guo     (45) Date of Patent:    Mar. 31, 2026

(54) MICROSCOPE OBJECTIVE LENS

(71) Applicant: AAC Raytech Optics (Changzhou) Co., Ltd., Changzhou City (CN)

(72) Inventor: Zhanli Guo, Changzhou City (CN)

(73) Assignee: AAC Raytech Optics (Changzhou) Co., Ltd., Changzhou City (CN)

( * ) Notice: Subject to any disclaimer, the term of this patent is extended or adjusted under 35 U.S.C. 154(b) by 326 days.

(21) Appl. No.: 18/399,755

(22) Filed: Dec. 29, 2023

(65) Prior Publication Data

US 2025/0044549 A1     Feb. 6, 2025

(51) Int. Cl.
   *G02B 9/36*       (2006.01)
   *G02B 21/02*     (2006.01)

(52) U.S. Cl.
   CPC .............. *G02B 9/36* (2013.01); *G02B 21/02* (2013.01)

(58) Field of Classification Search
   None
   See application file for complete search history.

(56) References Cited

U.S. PATENT DOCUMENTS

| 3,679,286 | A | * | 7/1972 | Klein ............. G02B 15/144105 |
| | | | | 359/686 |
| 6,950,241 | B1 | * | 9/2005 | Liang ...................... G02B 9/34 |
| | | | | 359/660 |
| 2002/0027710 | A1 | * | 3/2002 | Yonetani .............. G02B 21/361 |
| | | | | 359/691 |
| 2004/0051957 | A1 | * | 3/2004 | Liang .................... G02B 21/02 |
| | | | | 359/656 |

FOREIGN PATENT DOCUMENTS

CN       208224587 U   *   12/2018

* cited by examiner

*Primary Examiner* — Ryan Crockett

(74) *Attorney, Agent, or Firm* — Wiersch Law Group

(57) ABSTRACT

The present application relates to the field of optical lenses, and in particular, relates to a microscope objective lens suitable for use in a device such as a microscope. The microscope objective lens includes, in order from an emitting side to an objective side: a first lens having a positive refractive force, a second lens having a negative refractive force, a third lens having a negative refractive force, and a fourth lens having a positive refractive force; and the following relationship expressions are satisfied: $5.00 \leq f12/(d1+d2+d3) \leq 8.00$; $-4.00 \leq R7/R8 \leq -1.50$; $0.38 \leq f4/f \leq 0.53$; $0.20 \leq WD/TTL \leq 0.40$. The microscope objective lens of the present application has excellent optical performance, low aberration, a large field of view without distortion, and a 2-fold magnification, which is particularly suitable for optical microscopes.

8 Claims, 8 Drawing Sheets

40

Axial Aberration

Millimeter

MICROSCOPE OBJECTIVE LENS

TECHNICAL FIELD

The present application relates to the technical field of optical lenses, in particular to a microscope objective lens applicable in a device such as a microscope.

BACKGROUND

In recent years, there has been a growing demand for microscope lenses. However, conventional microscope lenses often exhibit distortions within their microscopic range due to optical structural constraints. Additionally, the length of microscope lenses is inevitably affected by the presence of multiple lenses, and elongated structures may result in a shorter working distance. The magnification is also influenced by the working distance, which may be inconvenient for operators.

With the advancement of technology and the increasing diversity of user demands, there is a growing need in scientific research for microscope lenses with improved observation quality. There is an urgent demand for microscope lenses that exhibit excellent optical characteristics, low distortion, and a large field of view without imaging distortion.

SUMMARY

The technical problem to be solved by the present application is to provide a microscope objective lens capable of satisfying the requirements of low aberration and large field of view without imaging distortion while obtaining high imaging performance.

In order to solve the above technical problem, the present application provides a microscope objective lens, the microscope objective lens comprising, in order from an emitting side to an objective side: a first lens having a positive refractive force; a second lens having a negative refractive force; a third lens having a negative refractive force; and a fourth lens having a positive refractive force;

wherein an on-axis thickness of the first lens is d1; an on-axis distance from the first lens to the second lens is d2; an on-axis thickness of the second lens is d3; a combined focal length of the first lens and the second lens is f12; a central radius of curvature of an emitting surface of the fourth lens is R7; a central radius of curvature of an objective surface of the fourth lens is R8; a focal length of the fourth lens is f4; focal length of the microscope objective lens is f; an on-axis distance from an objective surface of the microscope objective lens to an objective surface of the fourth lens is WD; an on-axis distance from the objective surface of the microscope objective lens to an emitting surface of the first lens is TTL, and the following relationship expressions are satisfied: $5.00 \le f12/(d1+d2+d3) \le 8.00$; $-4.00 \le R7/R8 \le -1.50$; $0.38 \le f4/f \le 0.53$; and $0.20 \le WD/TTL \le 0.40$.

In one embodiment, a central radius of curvature of an emitting surface of the third lens is R5; a central radius of curvature of an objective surface of the third lens is R6, and the following relationship expression is satisfied: $-0.30 \le R5/R6 \le -0.20$.

In one embodiment, a numerical aperture is NA, and the following relationship expression is satisfied: $0.045 \le NA \le 0.065$.

In one embodiment, the emitting surface of the first lens is convex at a proximal-axis position, and an objective surface of the first lens is convex at a proximal-axis position; a central radius of curvature of the emitting surface of the first lens is R1; a central radius of curvature of the objective surface of the first lens is R2; a focal length of the first lens is f1, and the following relationship expressions are satisfied: $0.12 \le f1/f \le 0.42$; $-0.14 \le (R1+R2)/(R1-R2) \le 0.01$; $0.01 \le d1/TTL \le 0.07$.

In one embodiment, an emitting surface of the second lens is concave at a proximal-axis position, and an objective surface of the second lens is convex at a proximal-axis position; a central radius of curvature of the emitting surface of the second lens is R3; a central radius of curvature of the objective surface of the second lens is R4; a focal length of the second lens is f2, and the following relationship expressions are satisfied: $-1.55 \le f2/f \le -0.36$; $-6.85 \le (R3+R4)/(R3-R4) \le -1.87$; $0.01 \le d3/TTL \le 0.07$.

In one embodiment, an emitting surface of the third lens is concave at a proximal-axis position, and an objective surface of the third lens is concave at a proximal-axis position; a focal length of the third lens is f3; an on-axis thickness of the third lens is d5, and the following relationship expressions are satisfied: $-0.42 \le f3/f \le -0.12$; $-0.11 \le d5/TTL \le 0.26$.

In one embodiment, the emitting surface of the fourth lens is convex at a proximal-axis position, and the objective surface of the fourth lens is convex at a proximal-axis position; an on-axis thickness of the fourth lens is d7, and the following relationship expression is satisfied: $0.02 \le d7/TTL \le 0.31$.

In one embodiment, the first lens, the second lens, the third lens, and the fourth lens are all made of glass.

The beneficial effect of the present application is that the microscope objective lens of the present application has excellent optical performance, low aberration, a large field of view without distortion, and a 2-fold magnification, which is particularly suitable for optical microscopes.

DETAILED DESCRIPTION OF THE EMBODIMENTS

The technical solutions in the embodiments of the present application are described clearly and completely below, and it is obvious that the described embodiments are only a part of the embodiments of the present application and not all of the embodiments. Based on the embodiments in the present application, all other embodiments obtained by a person of ordinary skill in the art without making creative labor fall within the scope of protection of the present application.

First Embodiment

Figure 1:
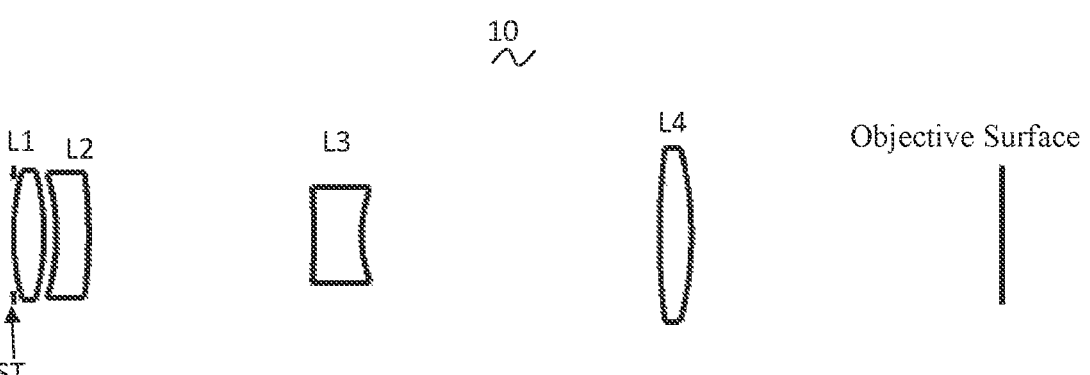
FIG. 1 is a structural schematic diagram of a microscope objective lens according to the first embodiment of the present application.

As shown in the accompanying drawings, the present application provides a microscope objective lens. FIG. 1 shows a microscope objective lens 10 of the first embodiment of the present application, and the microscope objective lens 10 includes six lenses. Specifically, the microscope objective lens 10, in order from an emitting side to an objective side, includes an aperture ST, a first lens L1, a second lens L2, a third lens L3, a fourth lens L4, and an objective surface.

It is defined that an on-axis thickness of the first lens L1 is d1, an on-axis distance from the first lens L1 to the second lens L2 is d2, an on-axis thickness of the second lens L2 is d3, and a combined focal length of the first lens L1 and the second lens L2 is f12. The following relationship expression is satisfied: $5.00 \leq f12/(d1+d2+d3) \leq 8.00$, in which a range of a ratio of a focal length and a thickness of the first lens group (consisting of the first lens L1 and the second lens L2) is specified. Within the range, it is helpful for the first lens group to have a sufficiently strong positive refractive force to correct the off-axis aberration at the lateral end of the image while maintaining a reasonable thickness.

It is defined that a central radius of curvature of an emitting side of the fourth lens L4 is R7, and a central radius of curvature of an objective surface of the fourth lens L4 is R8. The following relationship expression is satisfied: $-4.00 \leq R7/R8 \leq -1.50$, in which the shape of the first lens (i.e., the fourth lens L4) in the objective side is specified. Within the range, the refraction degree of the light rays into the microscopic objective 10 can be effectively controlled, and the chromatic aberration of the light rays can be effectively reduced, in which the chromatic aberration $|LC| \leq 0.8$ μm.

It is defined that a focal length of the fourth lens L4 is f4, and a focal length of the microscope objective lens 10 is f. The following relationship expression is satisfied: $0.38 \leq f4/f \leq 0.53$, in which a ratio of the focal length of the first lens in the objective side (i.e., the fourth lens L4) to the focal length of the microscope objective lens 10 is specified. Within the range, the deflection degree of the light rays into the microscope objective lens 10 can be effectively controlled, and the distortion of the micro-objective lens can be effectively controlled, in which the distortion $|Distortion| \leq 0.16\%$, thereby ensuring that the image is not distorted under a large field of view.

It is defined that an on-axis distance from the objective surface of the microscope objective lens 10 to the objective surface of the fourth lens L4 is WD, i.e., the working distance is WD. An on-axis distance from the objective surface of the microscope objective lens 10 to the emitting surface of the first lens L1 is TTL, i.e., the total optical length is TTL. The following relationship expression is satisfied: $0.20 \leq WD/TTL \leq 0.40$. The working distance WD is the distance from the observed object to the objective side closest to the object. TTL is the distance from the object to the objective lens at the farthest end. The ratio of the working distance and the total length of the system is specified. Within the range of the relationship expression, it can be ensured that there is an appropriate distance between the microscope objective lens 10 and the object, so that the microscope objective lens 10 has good operability, and makes the lens part a reasonable space to configure the lens in order to correct the aberration.

When the above relational equation is satisfied, the microscope objective lens 10 can be made to have good optical performance, while satisfying the design requirements of low aberration, a large field of view without distortion, and a 2-fold magnification.

It is defined that a central radius of curvature of an emitting surface of the third lens is R5, and a central radius of curvature of an objective surface of the third lens is R6. The following relationship expression is satisfied: $-0.30 \leq R5/R6 \leq -0.20$, in which the shape of the second lens of the objective side (i.e., the third lens L3) is specified. Within the range, the refraction angle of the light rays can be effectively lowered, thereby reducing the sensitivity of the whole system.

It is defined that the numerical aperture is NA, and the following relationship expression is satisfied: $0.045 \leq NA \leq 0.065$.

In this embodiment, the emitting surface of the first lens L1 is convex at a proximal-axis position, the objective surface of the first lens L1 is convex at a proximal-axis position, and the first lens L1 has a positive refractive force. In other embodiments, the emitting surface and the objective surface of the first lens L1 may also be set to other concave and convex distributions.

It is defined that a focal length of the first lens L1 is f1, and the following relationship expression is satisfied: $0.12 \leq f1/f \leq 0.42$, in which the positive refractive force of the first lens L1 is specified. Within this range, the first lens L1 has a suitable positive refractive force. In an embodiment, $0.19 \leq f1/f \leq 0.34$.

It is defined that the central radius of curvature of the emitting surface of the first lens L1 is R1, and the central radius of curvature of the objective side of the first lens L1 is R2. The following relationship expression is satisfied: $-0.14 \leq (R1+R2)/(R1-R2) \leq 0.01$. The shape of the first lens is reasonably controlled, so that the first lens is able to efficiently correct the systematic spherical aberration. In an embodiment, $-0.09 \leq (R1+R2)/(R1-R2) \leq 0.01$.

It is defined that an on-axis thickness of the first lens L1 is d1, and the following relationship expression is satisfied: $0.01 \leq d1/TTL \leq 0.07$, which is conducive to reasonable control of the total optical length. In an embodiment, $0.02 \leq d1/TTL \leq 0.05$.

In this embodiment, an emitting surface of the second lens L2 is concave at a proximal-axis position, an objective surface of the second lens L2 is convex at a proximal-axis position, and the second lens L2 has a negative refractive force. In other embodiments, the emitting surface and the objective surface of the second lens L2 may also be set to other concave and convex distributions.

It is defined that the focal length of the second lens L2 is f2, and the following relationship expression is satisfied: $-1.55 \leq f2/f \leq -0.36$. By controlling the negative optical focus of the second lens L2 in a reasonable range, it is conducive to correcting the aberration of the optical system. In an embodiment, $-0.97 \leq f2/f \leq -0.46$.

It is defined that a central radius of curvature of the emitting surface of the second lens L2 is R3, and a central radius of curvature of the objective side of the second lens L2 is R4. The following relationship expression is satisfied: $-6.85 \leq (R3+R4)/(R3-R4) \leq -1.87$. The shape of the second lens L2 is specified, which is conducive to correcting the problem of on-axis chromatic aberration when it is within the range. In an embodiment, $-4.28 \leq (R3+R4)/(R3-R4) \leq -2.34$.

An on-axis thickness of the second lens L2 is d3, and the following relationship expression is satisfied: $0.01 \leq d3/TTL \leq 0.07$, which is conducive to reasonably controlling the total optical length. In an embodiment, $0.02 \leq d3/TTL \leq 0.06$.

In this embodiment, an emitting surface of the third lens L3 is concave at a proximal-axis position, an objective surface of the third lens L3 is concave at a proximal-axis position, and the third lens L3 has a negative refractive force. In other embodiments, the emitting surface and the objective surface of the third lens L3 may also be set to other concave and convex distributions.

It is defined that the focal length of the third lens L3 is f3, and the following relationship expression is satisfied: $-0.42 \leq f3/f \leq -0.12$, which is conducive to correcting the aberration of the optical system by controlling the negative optical focus of the third lens L3 within a reasonable range. In an embodiment, $-0.26 \leq f3/f \leq -0.16$.

It is defined that an on-axis thickness of the third lens L3 is d5, and the following relationship expression is satisfied: $0.02 \leq d5/TTL \leq 0.26$, which is conducive to reasonably controlling the total optical length. In an embodiment, $0.02 \leq d5/TTL \leq 0.21$.

In this embodiment, an emitting surface of the fourth lens L4 is convex at a proximal-axis position, an objective surface of the fourth lens L4 is convex at a proximal-axis position, and the fourth lens L4 has a positive refractive force. In other embodiments, the emitting surface and the objective surface of the fourth lens L4 may also be set to other concave and convex distributions.

It is defined that an on-axis thickness of the fourth lens L4 is d7, and the following relationship expression is satisfied: $0.02 \leq d7/TTL \leq 0.31$. A ratio of the on-axis thickness of the fourth lens L4 to the total optical length TTL of the microscope objective lens 10 is specified, which is conducive to realizing ultra-thinness. In an embodiment, $0.03 \leq d7/TTL \leq 0.25$.

In this embodiment, the optical total length TTL (the on-axis distance from the emitting surface of the first lens L1 to the objective surface) of the microscope objective lens 10 is 92.493 mm.

In this embodiment, the field-of-view angle of the microscope objective lens 10 is 6.86°.

In this embodiment, the image height of the microscope objective lens 10 is 6.000 mm.

In this embodiment, the first lens, the second lens, the third lens, and the fourth lens are all made of glass.

The microscope objective lens 10 of the present application will be illustrated below by way of examples. The symbols recorded in each example are as follows. The focal length, the on-axis distance, the central radius of curvature, and the on-axis thickness are in mm.

Table 1 illustrates the design data of the microscope objective lens 10 of the first embodiment of the present application.

TABLE 1

| Design data of the microscope objective lens 10 | | | | | | | |
|---|---|---|---|---|---|---|---|
| | | R | d | | Nd | | Vd |
| ST | | INF | dST | 0.010 | | | |
| L1 | R1 | 22.271 | d1 | 2.860 | n1 | 1.4378 | v1 | 94.52 |
| | R2 | −22.271 | d2 | 1.150 | | | |
| L2 | R3 | −20.332 | d3 | 3.000 | n2 | 1.6921 | v2 | 54.54 |
| | R4 | −42.808 | d4 | 21.090 | | | |
| L3 | R5 | −61.548 | d5 | 4.470 | n3 | 1.5182 | v3 | 58.95 |
| | R6 | 13.183 | d6 | 27.850 | | | |
| L4 | R7 | 64.060 | d7 | 3.000 | n4 | 1.4970 | v4 | 81.61 |
| | R8 | −31.371 | d8 | 29.073 | | | |

The meaning of each symbol is as follows.

ST: aperture;

R: central radius of curvature of the optical surface;

R1: central radius of curvature of the emitting surface of the first lens L1;

R2: central radius of curvature of the objective surface of the first lens L1;

R3: central radius of curvature of the emitting surface of the second lens L2;

R4: central radius of curvature of the objective surface of the second lens L2;

R5: central radius of curvature of the emitting surface of the third lens L3;

R6: central radius of curvature of the objective surface of the third lens L3;

R7: central radius of curvature of the emitting surface of the fourth lens L4;

R8: central radius of curvature of the objective surface of the fourth lens L4;

d: on-axis thickness of the lens, the on-axis distance between the lenses;

dST: on-axis distance from the aperture ST to the emitting surface of the first lens;

d1: on-axis thickness of the first lens L1;

d2: on-axis distance from the objective side of the first lens L1 to the emitting surface of the second lens L2;

d3: on-axis thickness of the second lens L2;

d4: on-axis distance from the objective side of the second lens L2 to the emitting surface of the third lens L3;

d5: on-axis thickness of the third lens L3;

d6: on-axis distance from the objective side of the third lens L3 to the emitting surface of the fourth lens L4;

d7: on-axis thickness of the fourth lens L4;

d8: on-axis distance from the objective side of the fourth lens L4 to the objective surface;

Nd: refractive index of the line d;

n1: refractive index of the line d of the first lens L1;

n2: refractive index of the line d of the second lens L2;

n3: refractive index of the line d of the third lens L3;

n4: refractive index of the line d of the fourth lens L4;

vd: Abbe number;

v1: Abbe number of the first lens L1;

v2: Abbe number of the second lens L2;

v3: Abbe number of the third lens L3;

v4: Abbe number of the fourth lens L4.

Figure 2:
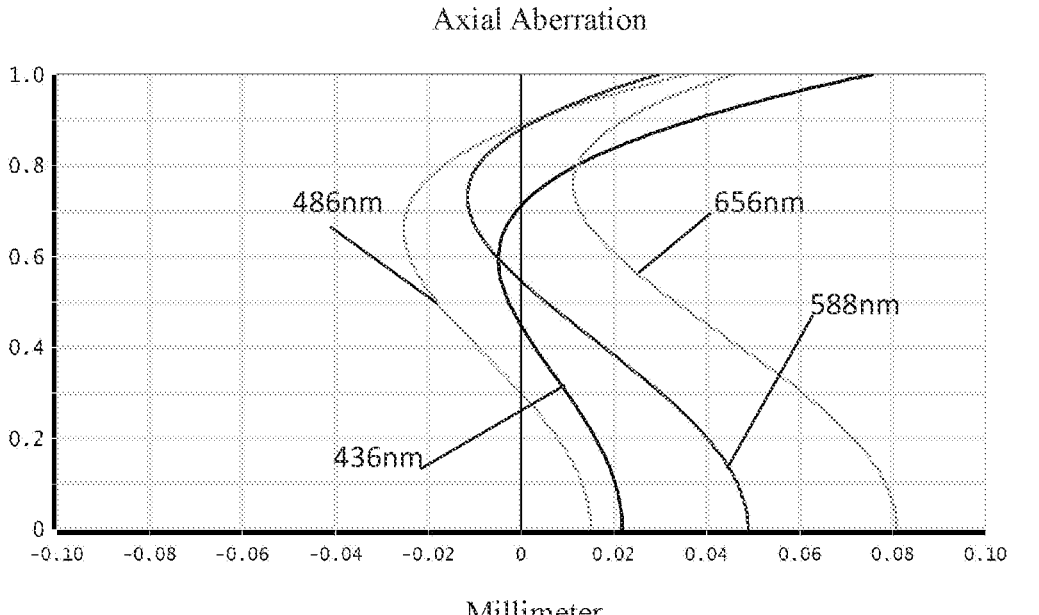
FIG. 2 is a schematic diagram showing the axial aberration of the microscope objective lens shown in FIG. 1.
Figure 3:
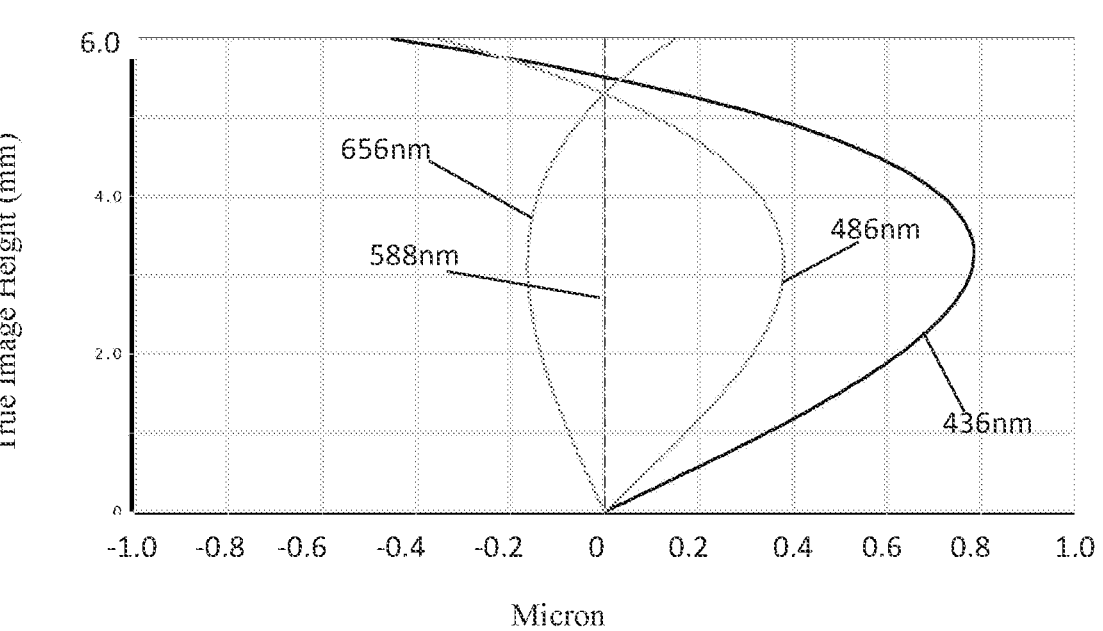
FIG. 3 is a schematic diagram showing the magnification chromatic aberration of the microscope objective lens shown in FIG. 1.
Figure 4:
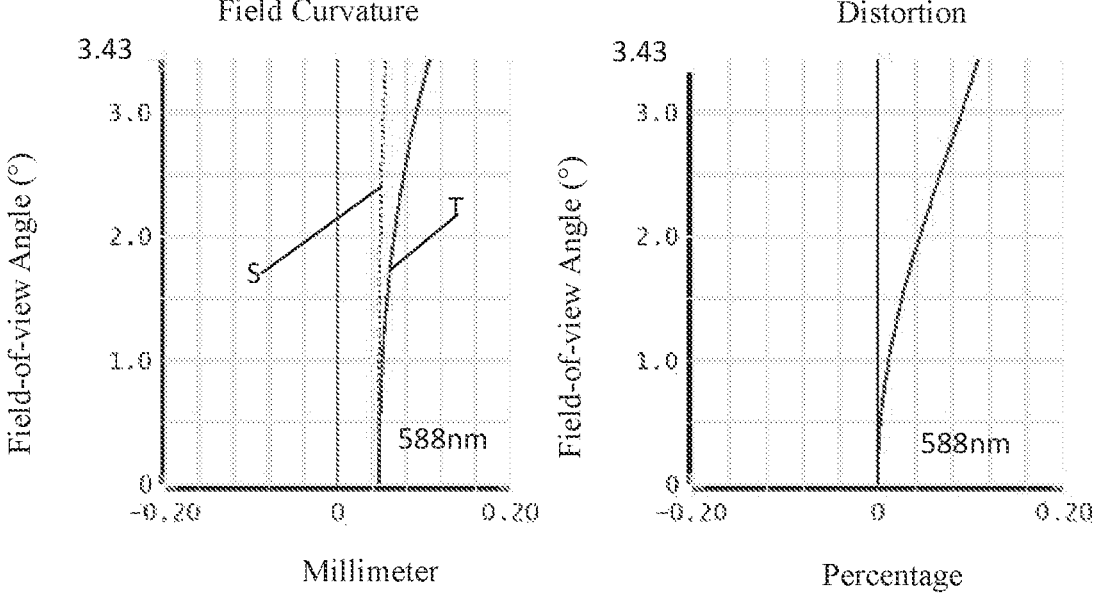
FIG. 4 is a schematic diagram showing the field curvature and distortion of the microscope objective lens shown in FIG. 1.

FIGS. 2 and 3 are schematic diagrams showing the axial aberration and the magnification chromatic aberration of light with wavelengths of 436 nm, 486 nm, 588 nm, and 656 nm, respectively, after passing through the microscope objective lens 10 of the first embodiment. FIG. 4 is a schematic diagram showing the field curvature and distortion of the light with a wavelength of 588 nm after passing through the microscope objective lens 10 of the first embodiment. The field curvature S in FIG. 4 is a field curvature in the arc-sagittal direction, and the field curvature T is a field curvature in the meridional direction.

Table 5 in the following shows the values corresponding to the various values in each of the first embodiment, second embodiment, third embodiment, and fourth embodiment, with respect to the parameters that have been specified in the relationship expressions.

As shown in Table 5, the first embodiment satisfies each of the relationship expressions.

In this embodiment, the microscope objective lens 10 described has an Entrance Pupil Diameter (ENPD) of 11.000 mm, a full field-of-view image height (IH) of 6.000 mm, a field-of-view angle (FOV) of 6.86° in the diagonal direction, a numerical aperture (NA) of 0.055 mm, a 2-fold magnification, and has excellent optical characteristics due to its on-axis and off-axis chromatic aberrations being sufficiently compensated.

Second Embodiment

Figure 5:
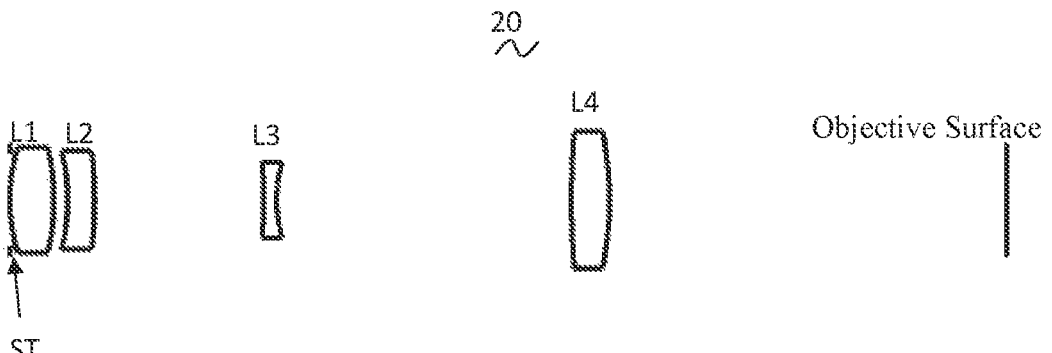
FIG. 5 is a structural schematic diagram of the microscope objective lens according to the second embodiment of the present application.

The second embodiment is essentially the same as the first embodiment, and the meaning of the symbols is the same as that of the first embodiment. The structural form of the microscope objective lens 20 of this second embodiment is shown in FIG. 5, and only the differences are listed below.

Table 2 shows the design data of the microscope objective lens 20 of the second embodiment of the present application.

TABLE 2

| | | Design data of microscope objective lens 20 | | | | | | |
|---|---|---|---|---|---|---|---|---|
| | | R | | d | | Nd | | Vd |
| ST | | INF | dST | 0.010 | | | | |
| L1 | R1 | 22.555 | d1 | 4.990 | n1 | 1.4378 | v1 | 94.52 |
| | R2 | −26.004 | d2 | 1.575 | | | | |
| L2 | R3 | −22.552 | d3 | 3.060 | n2 | 1.6921 | v2 | 54.54 |
| | R4 | −47.446 | d4 | 19.310 | | | | |
| L3 | R5 | −48.791 | d5 | 1.496 | n3 | 1.5182 | v3 | 58.95 |
| | R6 | 16.263 | d6 | 33.638 | | | | |
| L4 | R7 | 103.344 | d7 | 4.319 | n4 | 1.4970 | v4 | 81.61 |
| | R8 | −39.213 | d8 | 45.409 | | | | |

Figure 6:
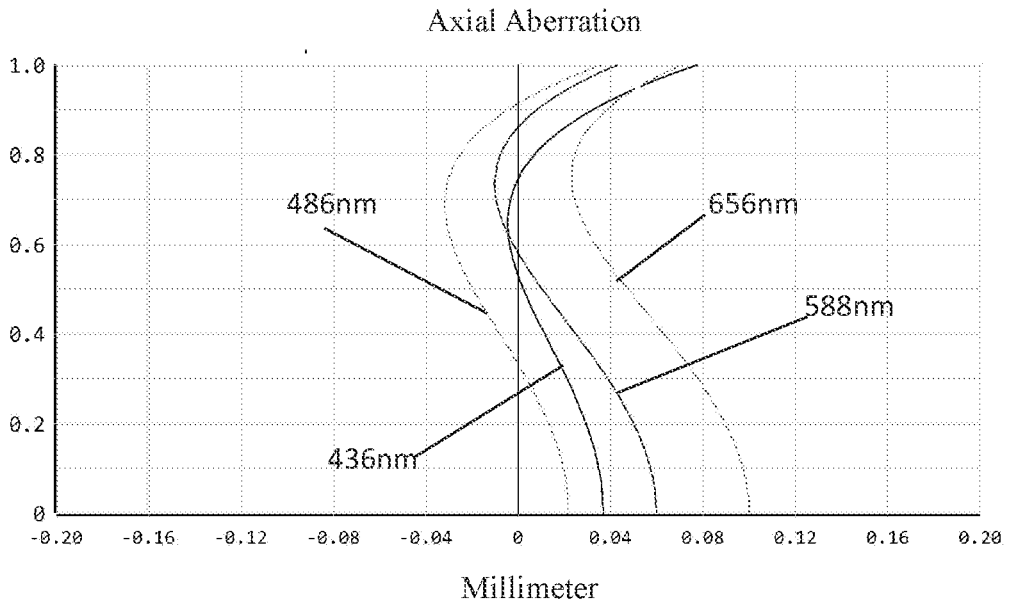
FIG. 6 is a schematic diagram showing the axial aberration of the microscope objective lens shown in FIG. 5.
Figure 7:
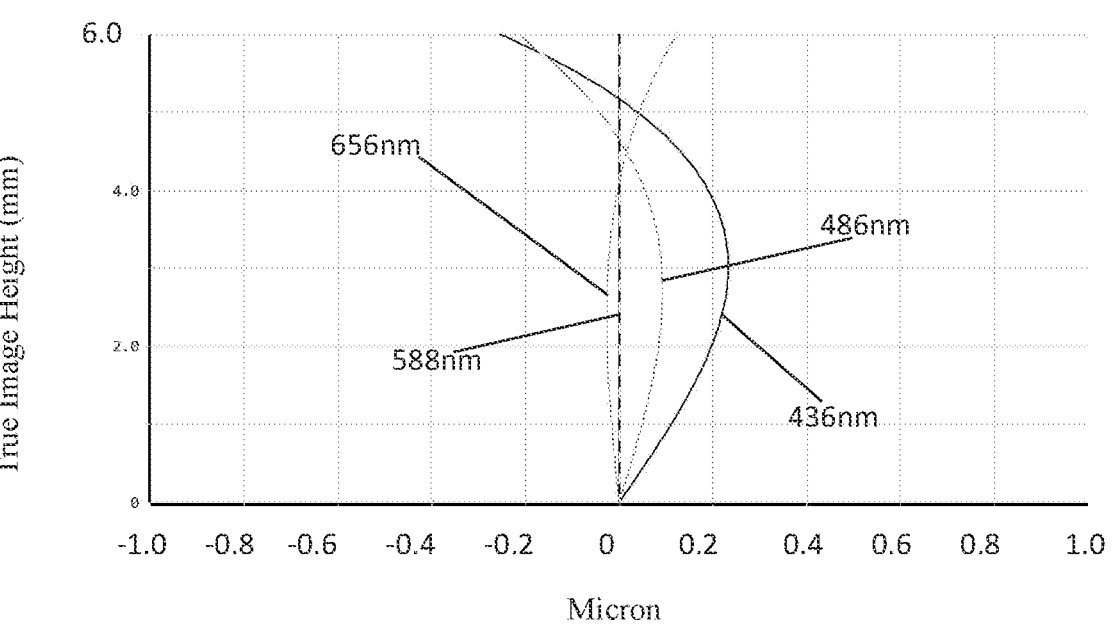
FIG. 7 is a schematic diagram showing the magnification chromatic aberration of the microscope objective lens shown in FIG. 5.
Figure 8:
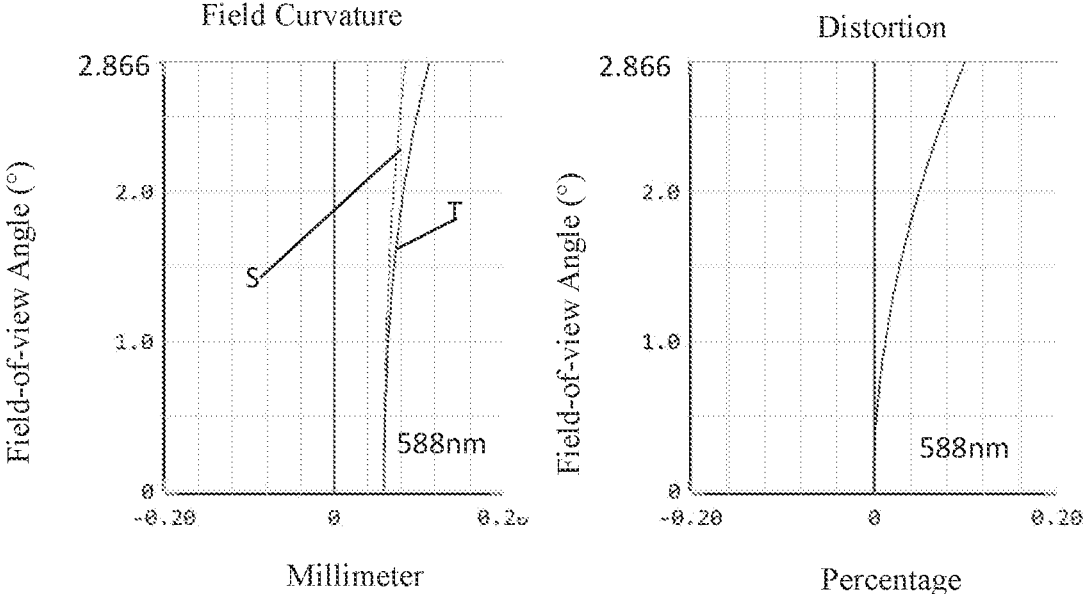
FIG. 8 is a schematic diagram showing the field curvature and distortion of the microscope objective lens shown in FIG. 5.

FIGS. 6 and 7 are schematic diagrams showing the magnification chromatic aberration and axial aberration of light with wavelengths of 436 nm, 486 nm, 588 nm, and 656 nm, respectively, after passing through the microscope objective lens 20 of the second embodiment. FIG. 8 is a schematic diagram showing the field curvature and distortion of the light with a wavelength of 588 nm after passing through the microscope objective lens 20 of the second embodiment. The field curvature S of FIG. 8 is the field curvature in the arc-sagittal direction, and the field curvature T is the field curvature in the meridional direction.

As shown in Table 4, the second embodiment satisfies each of the relationship expressions.

In this embodiment, the microscope objective lens 20 described has an Entrance Pupil Diameter (ENPD) of 11.000 mm, a full field-of-view image height of 6.000 mm, a field-of-view angle of 5.73° in the diagonal direction, a numerical aperture (NA) of 0.046 mm, a long working distance, and has excellent optical characteristics due to its on-axis and off-axis chromatic aberrations being sufficiently compensated.

Third Embodiment

Figure 9:
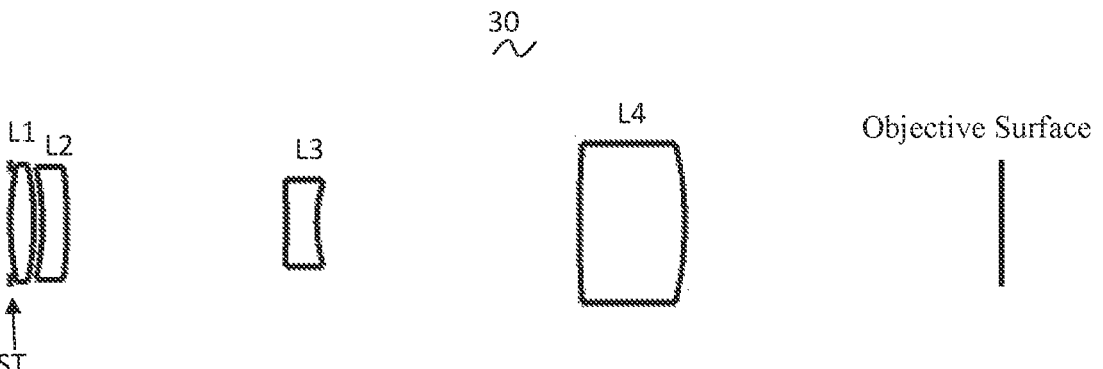
FIG. 9 is a structural schematic diagram of the microscope objective lens according to the third embodiment of the present application.

The third embodiment is essentially the same as the first embodiment, and the meaning of the symbols is the same as that of the first embodiment. The structural form of the microscope objective lens 30 of this third embodiment is shown in FIG. 9, and only the differences are listed below.

Table 3 shows the design data of the microscope 30 of the third embodiment of the present application.

TABLE 3

| | | Design data of microscope objective lens 30 | | | | | | |
|---|---|---|---|---|---|---|---|---|
| | | R | | d | | Nd | | Vd |
| ST | | INF | dST | 0.010 | | | | |
| L1 | R1 | 25.257 | d1 | 2.623 | n1 | 1.4378 | v1 | 94.52 |
| | R2 | −25.257 | d2 | 0.906 | | | | |
| L2 | R3 | −23.395 | d3 | 2.697 | n2 | 1.6921 | v2 | 54.54 |
| | R4 | −46.851 | d4 | 24.155 | | | | |
| L3 | R5 | −84.223 | d5 | 3.378 | n3 | 1.5182 | v3 | 58.95 |
| | R6 | 14.061 | de | 28.886 | | | | |
| L4 | R7 | 124.534 | d7 | 11.612 | n4 | 1.4970 | v4 | 81.61 |
| | R8 | −31.134 | d8 | 34.878 | | | | |

Figure 10:
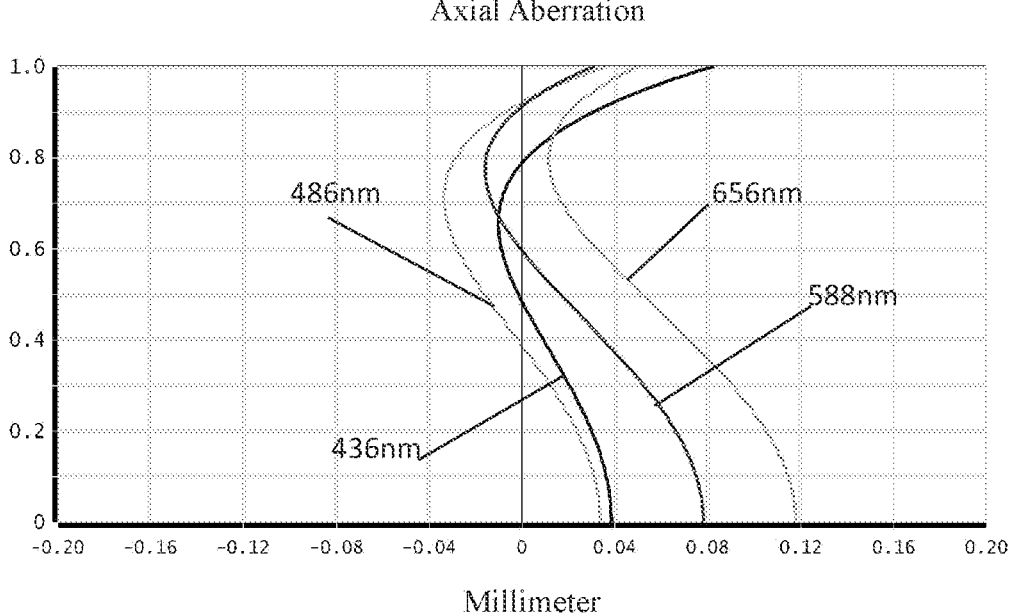
FIG. 10 is a schematic diagram showing the axial aberration of the microscope objective lens shown in FIG. 9.
Figure 11:
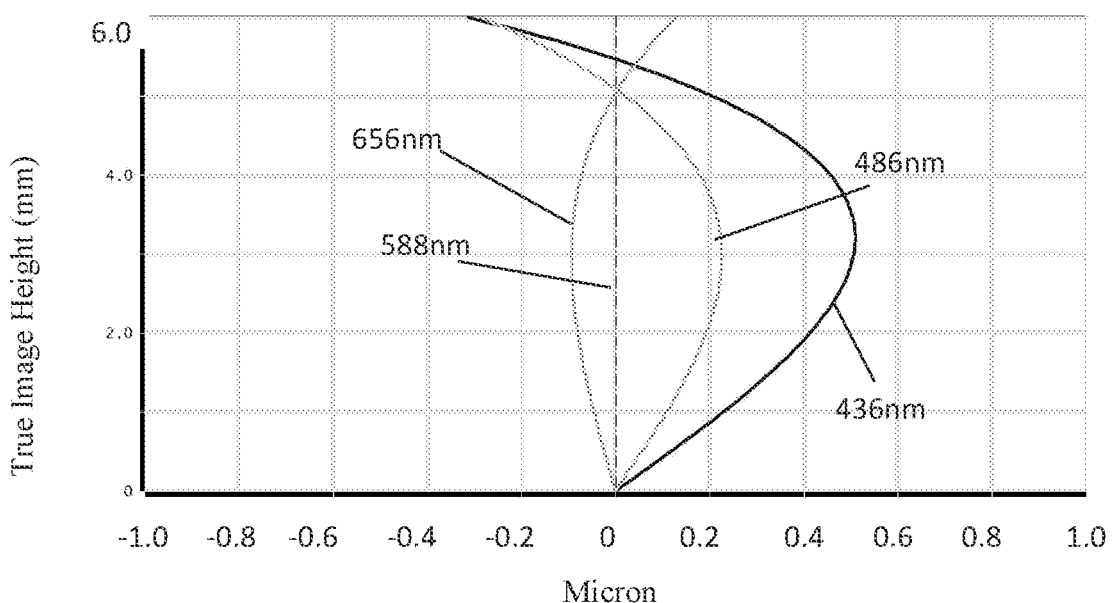
FIG. 11 is a schematic diagram showing the magnification chromatic aberration of the microscope objective lens shown in FIG. 9.
Figure 12:
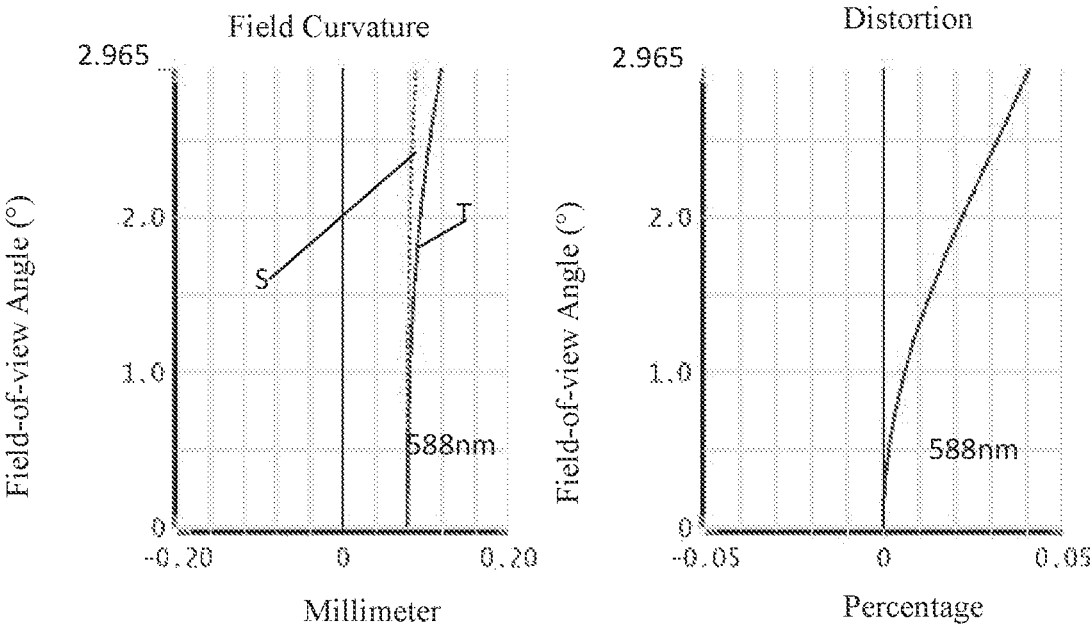
FIG. 12 is a schematic diagram showing the field curvature and distortion of the microscope objective lens shown in FIG. 9.

FIGS. 10 and 11 are schematic diagrams showing the magnification chromatic aberration and axial aberration of light with wavelengths of 436 nm, 486 nm, 588 nm, and 656 nm, respectively, after passing through the microscope objective lens 30 of the third embodiment. FIG. 12 is a schematic diagram showing the field curvature and distortion of the light with a wavelength of 588 nm after passing through the microscope objective lens 30 of the third embodiment. The field curvature S of FIG. 12 is the field curvature in the arc-sagittal direction and T is the field curvature in the meridional direction.

As shown in Table 5, the third embodiment satisfies each of the relationship expressions.

In this embodiment, the microscope objective lens 30 described has an Entrance Pupil Diameter (ENPD) of 11.000 mm, a full field-of-view image height of 6.000 mm, a field-of-view angle of 5.93° in the diagonal direction, a long working distance, a numerical aperture NA of 0.048 mm, and has excellent optical characteristics due to its on-axis and off-axis chromatic aberrations being sufficiently compensated.

Fourth Embodiment

Figure 13:
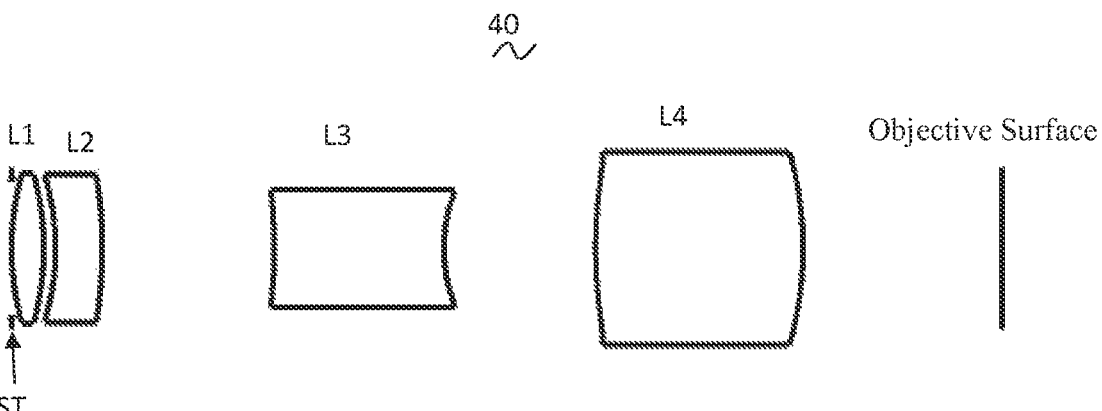
FIG. 13 is a structural schematic diagram of the microscope objective lens according to the fourth embodiment of the present application.

The fourth embodiment is essentially the same as the first embodiment, and the meaning of the symbols is the same as that of the first embodiment. The structural form of the microscope objective lens 40 of this fourth embodiment is shown in FIG. 13, and only the differences are listed below.

Table 4 shows the design data of the microscope objective lens 40 of the fourth embodiment of the present application.

TABLE 4

Design data of microscope objective lens 40

| | | R | | d | | Nd | | Vd |
|---|---|---|---|---|---|---|---|---|
| ST | | INF | dST | 0.010 | | | | |
| L1 | R1 | 25.257 | d1 | 2.623 | n1 | 1.4378 | v1 | 94.52 |
| | R2 | −25.257 | d2 | 0.906 | | | | |
| L2 | R3 | −23.395 | d3 | 2.697 | n2 | 1.6921 | v2 | 54.54 |
| | R4 | −46.851 | d4 | 24.155 | | | | |
| L3 | R5 | −84.223 | d5 | 3.378 | n3 | 1.5182 | v3 | 58.95 |
| | R6 | 14.061 | d6 | 28.886 | | | | |
| L4 | R7 | 124.534 | d7 | 11.612 | n4 | 1.4970 | v4 | 81.61 |
| | R8 | −31.134 | d8 | 34.878 | | | | |

Figure 14:
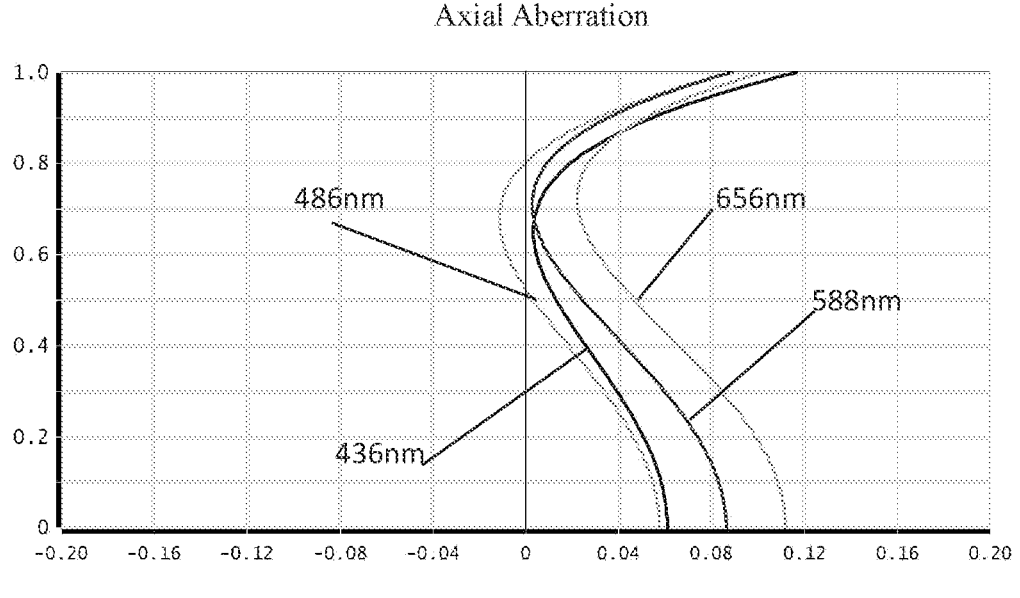
FIG. 14 is a schematic diagram showing the axial aberration of the microscope objective lens shown in FIG. 13.
Figure 15:
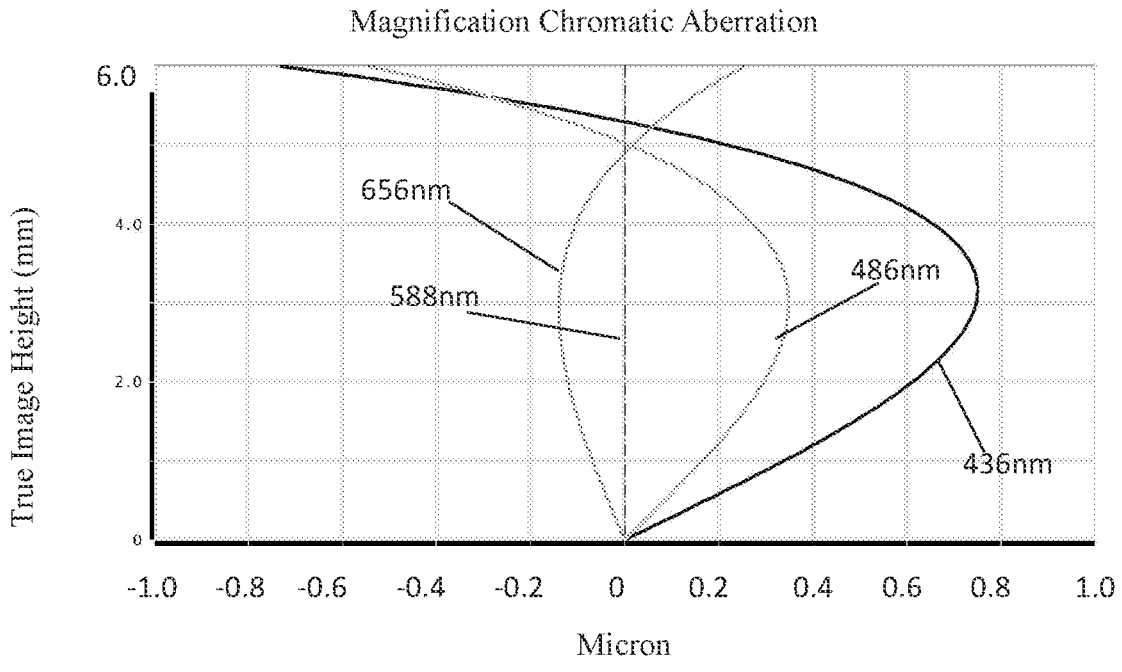
FIG. 15 is a schematic diagram showing the magnification chromatic aberration of the microscope objective lens shown in FIG. 13.
Figure 16:
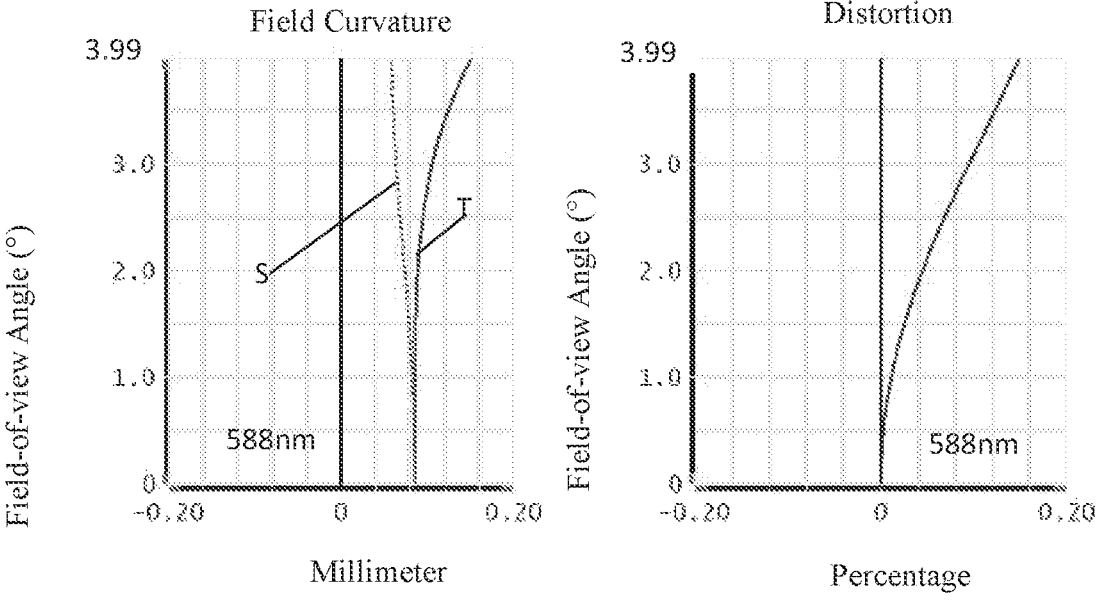
FIG. 16 is a schematic diagram showing the field curvature and distortion of the microscope objective lens shown in FIG. 13.

FIGS. 14 and 15 are schematic diagrams showing the magnification chromatic aberration and axial aberration, respectively, of light with wavelengths of 436 nm, 486 nm, 588 nm, and 656 nm after passing through the microscope objective lens 40 of the fourth embodiment. FIG. 16 is a schematic diagram showing the field curvature and distortion of light having a wavelength of 588 nm after passing through the microscope objective lens 40 of the fourth embodiment. The field curvature S of FIG. 16 is the field curvature in the arc-sagittal direction, and T is the field curvature in the meridional direction.

As shown in Table 5, the fourth embodiment satisfies each of the relationship expressions.

In this embodiment, the microscope objective lens 40 described has an Entrance Pupil Diameter (ENPD) of 11.000 mm, a full field-of-view image height of 6.000 mm, a field-of-view angle of 7.97° in the diagonal direction, a long working distance, a numerical aperture NA of 0.064 mm, and has excellent optical characteristics due to its on-axis and off-axis chromatic aberrations being sufficiently compensated.

TABLE 5

Values corresponding to various numerical values in each embodiment and the parameters already specified in the relationship expression

| Parameters and relationship expressions | First Embodiment | Second Embodiment | Third Embodiment | Fourth Embodiment |
|---|---|---|---|---|
| f12/ (d1 + d2 + d3) | 6.498 | 5.002 | 7.997 | 5.000 |
| R7/R8 | −2.042 | −2.635 | −4.000 | −1.500 |
| f4/f | 0.428 | 0.482 | 0.444 | 0.386 |
| WD/TTL | 0.314 | 0.399 | 0.320 | 0.201 |
| R5/R6 | −4.669 | −3.000 | −5.990 | −3.247 |
| f | 99.995 | 119.754 | 115.800 | 85.963 |
| f1 | 25.942 | 28.481 | 29.308 | 24.228 |
| f2 | −59.182 | −65.393 | −70.850 | −66.631 |
| f3 | −20.534 | −23.356 | −22.983 | −16.038 |
| f4 | 42.818 | 57.778 | 51.387 | 33.202 |
| f12 | 45.548 | 48.148 | 49.789 | 39.254 |
| TTL | 92.493 | 113.797 | 109.135 | 85.924 |
| IH | 6.000 | 6.000 | 6.000 | 6.000 |
| FOV | 6.86° | 5.73° | 5.93° | 7.97° |
| NA | 0.055 | 0.046 | 0.0475 | 0.064 |
| Magnification | 2 | 2 | 2 | 2 |

It can be understood by those of ordinary skill in the art that each of the above embodiments is a specific embodiment for realizing the present application, and that various changes can be made thereto in form and detail in practical application without departing from the spirit and scope of the present application.

What is claimed is:

1. A microscope objective lens, comprising in order from an emitting side to an objective side:
   a first lens having a positive refractive force;
   a second lens having a negative refractive force;
   a third lens having a negative refractive force; and
   a fourth lens having a positive refractive force;
   wherein an on-axis thickness of the first lens is d1; an on-axis distance from the first lens to the second lens is d2; an on-axis thickness of the second lens is d3; a combined focal length of the first lens and the second lens is f12; a central radius of curvature of an emitting surface of the fourth lens is R7; a central radius of curvature of an objective surface of the fourth lens is R8; a focal length of the fourth lens is f4; focal length of the microscope objective lens is f; an on-axis distance from an objective surface of the microscope objective lens to an objective surface of the fourth lens is WD; an on-axis distance from the objective surface of the microscope objective lens to an emitting surface of the first lens is TTL, and the following relationship expressions are satisfied:

$$5.00 \leq f12/(d1 + d2 + d3) \leq 8.00;$$

$$-4.00 \leq r7/r8 \leq -1.50;$$

$$0.38 \leq f4/f \leq 0.53;$$

$$0.20 \leq WD/TTL \leq 0.40.$$

2. The microscope objective lens of claim 1, wherein a central radius of curvature of an emitting surface of the third lens is R5; a central radius of curvature of an objective surface of the third lens is R6, and the following relationship expression is satisfied:

$$-0.30 \leq R5/R6 \leq -0.20.$$

3. The microscope objective lens of claim 1, wherein a numerical aperture is NA, and the following relationship expression is satisfied:

$$0.045 \leq NA \leq 0.065.$$

4. The microscope objective lens of claim 1, wherein the emitting surface of the first lens is convex at a proximal-axis position, and an objective surface of the first lens is convex at a proximal-axis position;
   a central radius of curvature of the emitting surface of the first lens is R1; a central radius of curvature of the objective surface of the first lens is R2; a focal length of the first lens is f1, and the following relationship expressions are satisfied:

$$0.12 \leq f1/f \leq 0.42;$$

$$-0.14 \leq (R1 + R2)/(R1 - R2) \leq 0.01;$$

$$0.01 \leq d1/TTL \leq 0.07.$$

5. The microscope objective lens of claim 1, wherein an emitting surface of the second lens is concave at a proximal-axis position, and an objective surface of the second lens is convex at a proximal-axis position;

a central radius of curvature of the emitting surface of the second lens is R3; a central radius of curvature of the objective surface of the second lens is R4; a focal length of the second lens is f2, and the following relationship expressions are satisfied:

$$-1.55 \leq f2/f \leq -0.36;$$

$$-6.85 \leq (R3 + R4)/(R3 - R4) \leq -1.87;$$

$$0.01 \leq d3/TTL \leq 0.07.$$

6. The microscope objective lens of claim 1, wherein an emitting surface of the third lens is concave at a proximal-axis position, and an objective surface of the third lens is concave at a proximal-axis position;

a focal length of the third lens is f3; an on-axis thickness of the third lens is d5, and the following relationship expressions are satisfied:

$$-0.42 \leq f3/f \leq -0.12;$$

$$0.02 \leq d5/TTL \leq 0.26.$$

7. The microscope objective lens of claim 1, wherein the emitting surface of the fourth lens is convex at a proximal-axis position, and the objective surface of the fourth lens is convex at a proximal-axis position;

an on-axis thickness of the fourth lens is d7, and the following relationship expression is satisfied:

$$0.02 \leq d7/TTL \leq 0.31.$$

8. The microscope objective lens of claim 1, wherein the first lens, the second lens, the third lens, and the fourth lens are all made of glass.

\* \* \* \* \*